United States Patent
Yokoyama et al.

(10) Patent No.: US 6,459,733 B1
(45) Date of Patent: Oct. 1, 2002

(54) APPARATUS AND METHOD FOR ENCODING VIDEO IMAGES INCLUDING FADE TRANSITION

(75) Inventors: Yutaka Yokoyama; Yasushi Ooi, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/372,490

(22) Filed: Aug. 12, 1999

(30) Foreign Application Priority Data

Aug. 12, 1998 (JP) .......................................... 10-227478

(51) Int. Cl.$^7$ ................................................. H04N 7/12
(52) U.S. Cl. .................. 375/240.12; 348/595; 348/494; 348/700
(58) Field of Search ................................. 348/595, 400, 348/390, 404, 700; 375/240, 240.12

(56) References Cited

U.S. PATENT DOCUMENTS

| 5,686,963 | A | * | 11/1997 | Uz | .............................. | 348/404 |
| 5,920,360 | A | * | 7/1999 | Coleman | ..................... | 348/700 |
| 6,259,733 | B1 | * | 7/2001 | Kaye | .......................... | 375/240 |
| 6,310,917 | B1 | * | 10/2001 | Omote | ........................ | 375/240 |

FOREIGN PATENT DOCUMENTS

JP          8-65565           3/1996

OTHER PUBLICATIONS

"Motion Vector Detection During Fade In or Out," by Jyoji Naitou et al., pp. 275–276, released at the Picture Coding Symposium of Japan held in Oct., 1992 in Japan. (English–language Abstract provided for this document. Also see discussion on p. 2 of the specification).

"Test Model5," International Organisation for Standardisation, ISO–IEC/JTC1/SC29/WG11, Coded Representation of Picture and Audio Information, Telecommunication Standardization Sector, Study Group for ATM Video Coding (Rapporteur's Group on Part of Q.2/15), Document AVC–491b, Version 2, Apr., 1993.

* cited by examiner

Primary Examiner—Chris Kelley
Assistant Examiner—Charles E Parsons
(74) Attorney, Agent, or Firm—Dickstein, Shapiro, Morin & Oshinsky, LLP.

(57) ABSTRACT

Video images including a fade transition are encoded using inter-frame prediction. A fade detector is provided to detect a fade transition by way of analyzing incoming images successively applied thereto. The fade detector generates first information indicating if the fade transition is fade-in fade-out, and also predicts fade duration and then generates second information indicating the predicted fade duration. A bit amount adjuster is provided to adjust allocated bit amount during fade using the first and second information. A motion image encoder is provided to encode the incoming images using the number of bits which has been determined by the bit amount adjuster.

19 Claims, 10 Drawing Sheets

APPARATUS AND METHOD FOR ENCODING VIDEO IMAGES INCLUDING FADE TRANSITION

BACKGROUND OF THE INVENTION

1. Field of the Invention

The present invention relates generally to a digital video signal encoding system and method, and more specifically to such an encoding system and method for encoding a fading video signal made up of a series of video images. Further, the present invention features techniques for detecting fade transitions in digital video images.

2. Description of the Related Art

In order to attain high efficiency of motion picture encoding, it is known in the art to use motion compensation inter-frame prediction that is typically given in the standard proposed by ISO/IEC-13818 (generally known as MPEG-2). According to the encoding technique using the motion compensation inter-frame prediction, an image with which encoding has been completed is used as a reference image which is in turn used to predict the next image. More specifically, the displacements in a currently processing image with respect to the reference image are detected for generating motion vectors. The motion picture inter-frame prediction is then implemented using the motion vectors to generate the predicted image. Subsequently, the information to be used for image prediction is encoded which information includes the motion vectors, motion compensation prediction errors, etc. The prediction errors is subject to a DCT (discrete cosine transform) and then is quantized, wherein the quantizing levels are variable length encoded.

Throughout the instant disclosure, term "image" is interchangeably used with term "picture".

However, with the above-mentioned conventional encoding techniques, when the motion compensation inter-frame prediction is implemented, the inter-frame prediction errors undesirably become large. This is because the fading images, such as fade-in and fade-out images, exhibits a considerably large time dependent change with respect to the brightness and inter-frame differences between subsequent images.

Therefore, in order to implement the motion picture encoding at a predetermined bit rate, it is necessary to increase the quantizing step sizes and keep the amount of the codes thus generated within a predetermined range. This constant leads to the problem, which causes considerable degradation of picture quality at the time of fading.

In order to overcome the just-mentioned problem, it is proposed in Japanese Laid-open Patent Application No. 08-065565 (conventional art 1), to use the control signal of a video camera for controlling the encoding process. The control signal includes information generated when the fading is carried out. That is, when the fading is commenced, the arrangement of picture types is changed so as to increase bi-directional predicting pictures.

Another approach to overcoming the degradation of picture quality during fade is disclosed in a paper (conventional art 2) entitled "Motion vector detection during fade in and fade out" by Jyoji Naitou, et al., pages 275–276, released at the Picture Coding Symposium of Japan held on October, 1992 in Japan. This paper disclosed that the fade transition is ascertained when an average ratio of inter-frame luminance over a series of images exceeds a predetermined value and, at the same time, when a ratio of the average ratio of inter-frame luminance falls within a predetermined range, further, the paper taught that, when detecting the motion vectors for use in implementing motion compensated-frame prediction, the accurate motion vectors can be obtained by compensating for the differences between a reference and current images, whereby prediction errors are able to be decreased.

The above-mentioned conventional techniques however, have encountered the following problems.

The first conventional technique is unable to sufficiently lower the degradation of picture quality. That is, as in this conventional technique, if the picture type arranging structure is changed during fade transitions and if the number of bi-directional prediction pictures is increased, the luminance value of the predicted picture (image) becomes a mid value of the preceding and following core pictures. A cure picture means a reference image, which is used when implementing the inter-frame prediction. However, the luminance value does not necessarily take the value reflecting a ratio of time duration with respect to the reference picture and accordingly, it is not seldom to be unable to properly implement the inter-frame prediction. In connection with the pictures obtained using bi-directional prediction, the inter-frame prediction is performed by making a reference to the preceding and following pictures.

Further, the second conventional technique has encountered the problem that the encoder under ably becomes bulky in terms at configuration. More specifically, with the conventional techniques, the brightness compensation is implemented when detecting the motion vectors. This leads to the fact that three additional devices become necessary: the first device is to calculate an average brightness over an entire image; me second device is to generate an image whose brightness has been compensated: and the third device is to store the resultant image.

Still further, the second conventional techniques is unable to detect fade transitions with high confidence in that each of them carries out the fade detection using only time dependent brightness change. However, in the case of fade-to-white and fade-from-white image transition sequences. The brightness does not change in a simple manner. Therefore, each of the conventional techniques is unable to comply with such case.

SUMMARY OF THE INVENTION

It is therefore an object of the present invention to provide an encoder which is able to overcome the above-mentioned problems inherent in the conventional encoding techniques.

Another object of the present invention is to provide a method which is able to overcome the above-mentioned problems inherent in the conventional encoding techniques.

Still another object of the present invention is to provide techniques wherein fade-out transitions of images are encoded by allocating relatively large number of bits at the beginning of the fade-out transitions, and then the number of bits are gradually decreased toward the and of the fade-out.

Still another object of the present invention is to provide techniques wherein the images during fade in transitions are encoded by allocating relatively small number of bite at the beginning of the fade in transitions, and then the number of bits are gradually increased toward the end of the fade in.

These objects are fulfilled by techniques wherein video images including a fade transition are encoded using inter-frame prediction. A fade detector provided to detect a fade transition by way of analyzing incoming images successively applied thereto. The fade detector generates first information indicating if the fade transition is fade-in or fade-out, and also predicts fade duration and then generates second information indicating the predicted fade duration. A bit amount adjuster is provided to adjust allocated bit amount during fade using the first and second information. A motion image encoder is provided to encode the incoming images using the number of bits which has been determined by the bit amount adjuster.

One aspect of the present invention resides in an apparatus for encoding video images including a fade transition using inter-frame prediction, comprising: a fade detector for detecting a fade transition by analyzing incoming images successively applied thereto, the fade detector generating first information indicating if the fade transition is fade-in or fade-out, the fade detector predicting fade duration and generating second information indicating predicted fade duration; a bit amount adjuster for adjusting allocated bit amount during fade using the first and second information; and a motion image encoder for encoding the incoming images using an amount of bits determined by the bit amount adjuster.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Embodiments of the present invention wilt be described with reference to the accompanying drawings, like numerals being used for like and corresponding parts of the various drawings.

Figure 1:
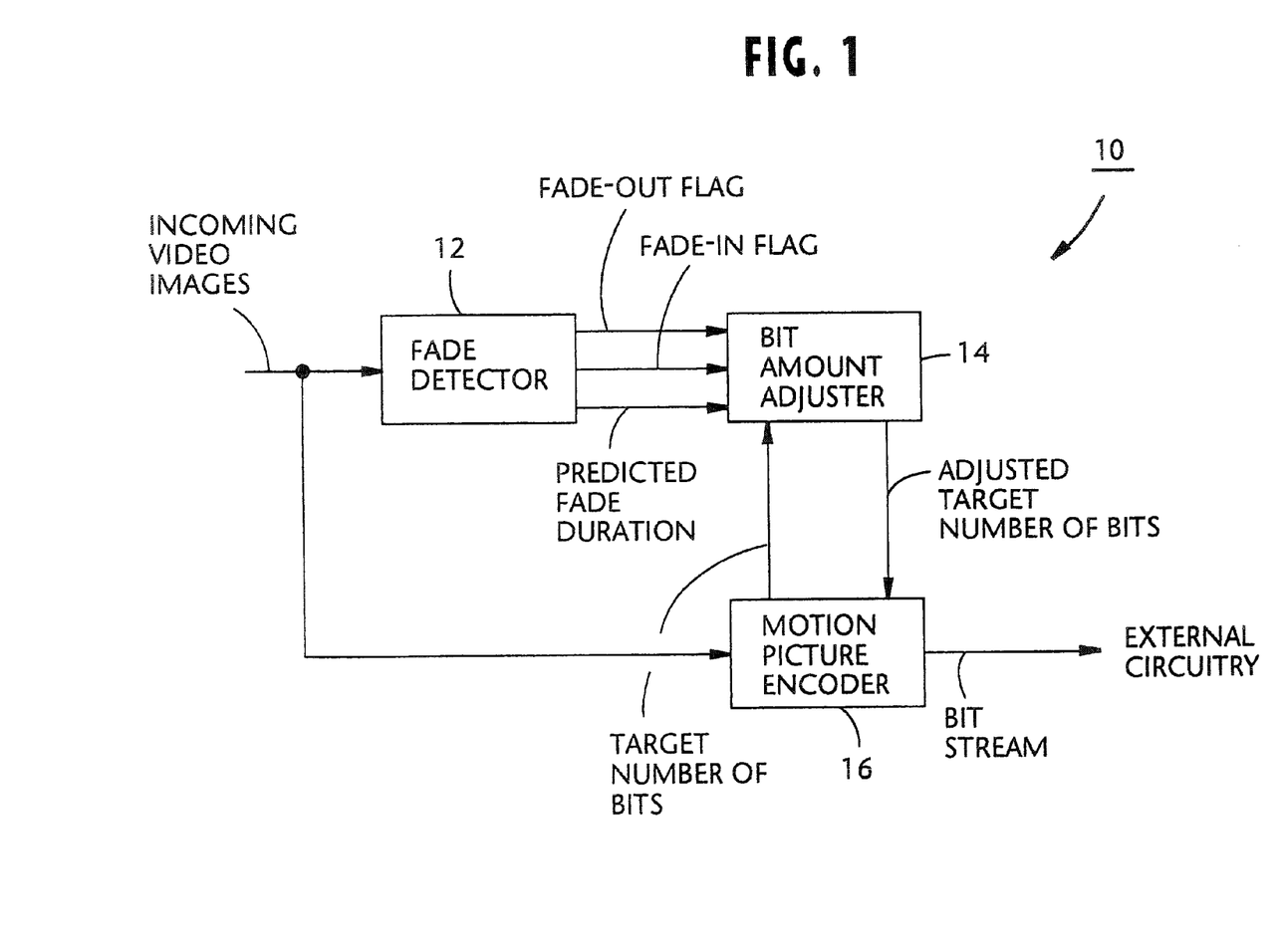
FIG. 1 is a block diagram schematically showing an overall video image encoder according to an embodiment of the present invention.

FIG. 1 is a diagram schematically showing an arrangement of an encoder 10 for detecting fade transitions of incoming digital video images (pictures). As shown. the arrangement generally comprises a lade detector 12, a bit number adjuster 14. and a motion picture encoder 16.

The fade detector 12 receives and analyzes sequentially incoming digital images on an image-by-image basis. When the fade detector 12 detects fade transitions in a digital video signal made up of a series of video images, the detector 12 generates fade-in flag or fade-out flag depending on the direction of fade detected. Further, the fade detector 12 predicts and outputs the fade duration using the analysis results and outputs a signal indicative thereof. The fade detector 12 will be discussed in detail with reference to FIGS. 3 to 6.

The bit amount adjuster (or bit number adjuster) 14 receives a target amount of bits for each image which has been determined by the motion picture encoder 10. Thereafter, the bit amount adjuster 14 adjusts the target amount of bits depending on the fade detection result (via fade-in or fade-out), and outputs the amount of adjusted bits which is applied to the motion picture encoder 16. The bit amount adjuster 14 will be discussed in detail with reference to FIG. 7.

The motion picture encoder 16 is to encode each of the incoming digital video images within a predetermined (allocated) number of bits. More specifically, the motion picture encoder 16 utilizes compression algorithms to generate an MPEG-2 compliant bit stream from the sequence of images. The encoder 16 outputs the target amount of bits for each image, which is determined for each image in consideration of bit rate and is supplied to the bit amount adjuster 14. Thereafter, the encoder 16 receives the adjusted target amount of bits from the bit amount adjuster 14 and encodes each of the incoming digital images using known techniques of TEST MODEL ("Test Model 5", ISO/IEC JTC1/SC29/WG11/N0400. April 1993) of 13818-2(MPEG-2 video).

Figure 2:
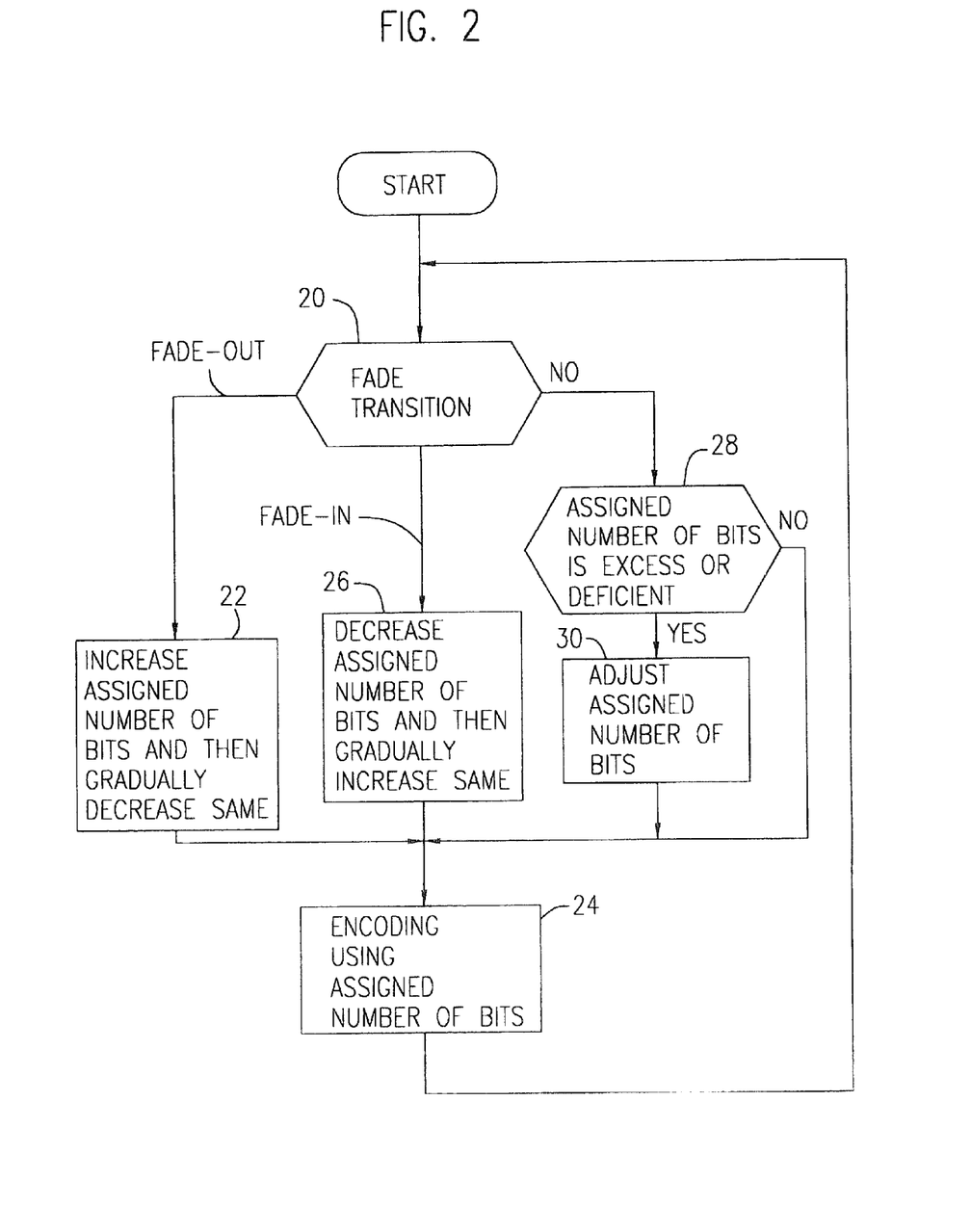
FIG. 2 is a flow chart which shows the steps which characterize the operation of the encoder of FIG. 1.

FIG. 2 is a flow chart which shows the steps which characterize the operation of the arrangement of FIG. 1.

In FIG. 2, at step 20, a check is made to determine if a fade transition occurs with the incoming images. In the case where fade-out is detected at step 20, the amount of allocated bits is increased with respect to the fading images at the beginning of the fade-out duration and then is gradually decreased over the following fade-out duration (step 22). Subsequently, the routine proceeds to step 24 at which each of the fading images are encoded using the allocated number of bits. Contrarily, if fade in is detected at step 20, the amount of allocated bits is decreased at the beginning of the fade-in duration and then is gradually increased during the following fade-in time period (step 26). Subsequently, the routine proceeds to step 24 at which each of the fading images is encoded using the allocated number of bits.

On the other hand, at step 20, if no fade is detected, the routine goes to step 28 at which further check is made to determine if the number of currently allocated bits is excess or deficient in connection with the average (or predetermined) bit rate. If the answer to the inquiry made at step 28 is affirmative (viz., the number of currently allocated bits is found to be excess or deficient in connection with the average bit rate at step 26), then the number of currently allocated bits is adjusted at step 30. Following this, the routine goes to step 24 at which each of the images is encoded using the allocated number of bits. On the contrary, if the answer to the inquiry made at step 28 is negative, the routine directly proceeds to step 24.

Figure 3:
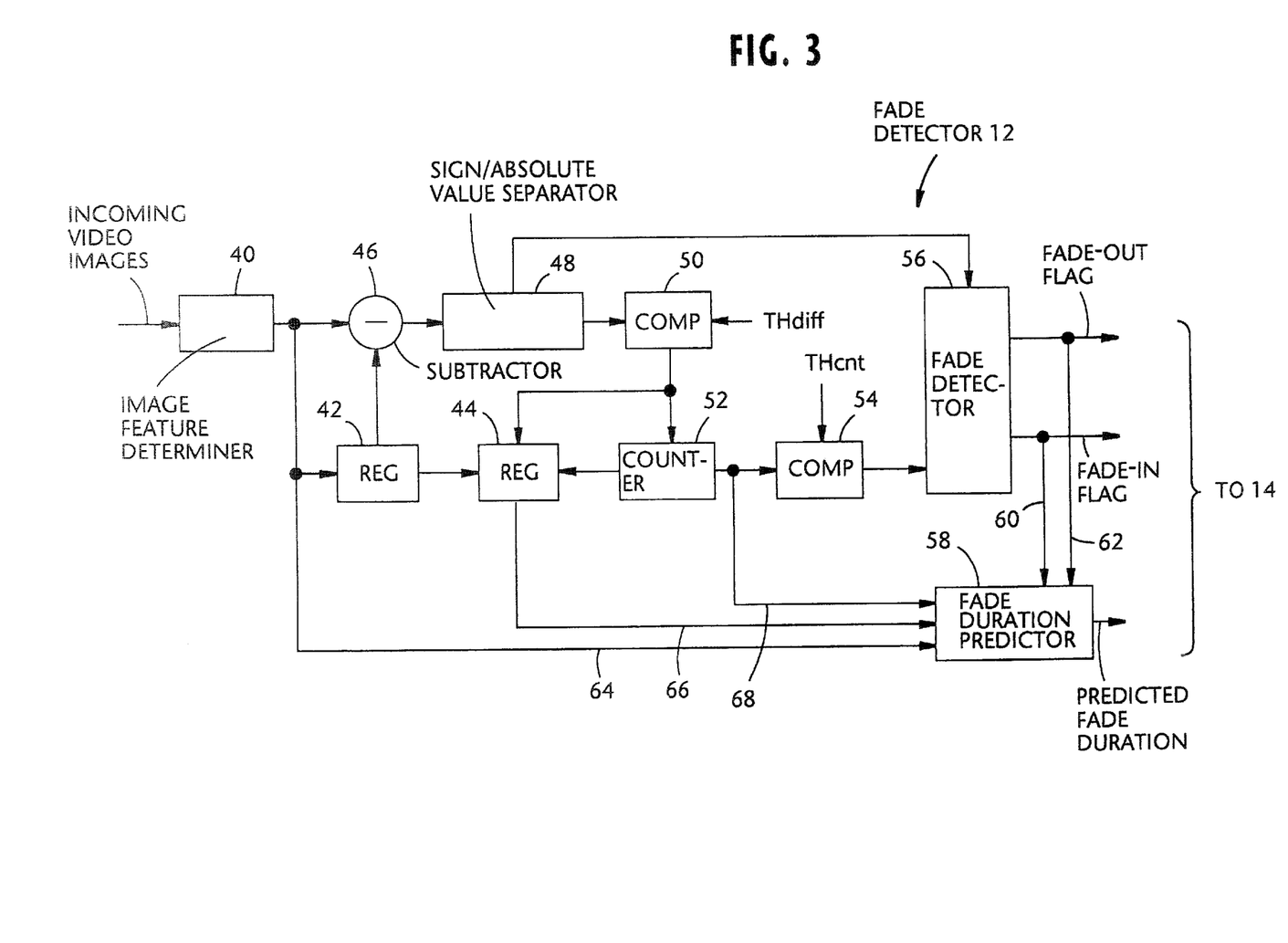
FIG. 3 is a block diagram showing a lade detector of FIG. 1 in detail.

Referring now to FIG. 3, the fade detector 12 of FIG. 1 is shown in detail in block diagram form. As shown, the fade detector 12 comprises an image feature determiner 40, two registers 42 and 44, a subtractor (viz. difference detector) 46, a sign/absolute value separator 48, two comparators 50 and 54, a counter 52, a fade determiner 56, and a fade duration predictor 58.

The image feature determiner 40 calculates the distinctive image feature on an image-by-image basis. In the case of an interlaced signal, the image may be a frame consisting of even and odd line fields, or may be either of even line field and odd line field, The feature of an image is able to determine the property (or quality) of the image. That is, the feature of an image is able to specify whether the image in question is low or high brightness image, an even or uneven image, or a fine or coarse image. In other words, the determined feature of the image is indicative of the degree of the property of the image.

By way of example, the feature of an image is determined by calculating the sum of the absolute values of differences between adjacent pixels (viz. picture elements). More specifically, the brightness of a given pixel is compared with that of the neighboring pixel at the right side or at just below thereof on the next line, after which the difference between them is calculated and the sum of the absolute values thereof is obtained. Thus, an average value of the difference value is calculated by dividing the total sum of the difference values by the total number of pixels of the image. It is preferable to employ the average difference value of the image because the average value is not affected by an image size.

On the other hand, in the case where as in a color image, a pixel is comprised of a plurality of values or components, either one or all of the values can be utilized. For example, in the case where color pixel comprises a brightness value Y and two color difference components Cb and Cr, the above-mentioned feature of an image can be determined using either Y or all of Y, Cb and Cr.

The image distinctive feature value, outputted from the image feature determiner 40, is held in the register 42. As mentioned above, the value of the image feature is the total sum of the absolute values between pixels or the average value obtained by dividing the sum by the total number of pixels within one image. The content of the register 42 is applied to the subtractor 46 which also receives the next output of the image feature determiner 40. That is, the subtractor 46 generates a difference between image feature values of the current and preceding images. The difference value, outputted from the subtractor 46, is separated into the sign and the absolute value at the sign/absolute value separator 48. The sign signal is applied to the fade detector 56. On the other hand, the absolute value (viz., absolute difference value) is fed to the comparator 50 and is compared thereat with a threshold THdiff and generates the comparison result.

When the output of the comparator 50 indicates that the absolute difference value from the block 48 exceeds the threshold THdiff for the first time, the image feature value at that time is field in the register 44. The counter 52 responds to the output of the comparator 50 and increments the value thereof by one at each time when the absolute value applied to the comparator 50 exceeds the threshold THdiff, and, otherwise, the counter 52 is reset or initialized. That is, the counter 52 counts the number of pictures after the absolute value exceeds the threshold THdiff. The content (viz., the number of pictures) of the counter 52 is applied to the comparator 54 and is compared thereat with a threshold THcnt, and the comparison result is applied to the fade detector 56.

In the case where the fade detector 56 detects that the comparison result applied thereto from the comparator 54 indicates that the output of the counter 52 exceeds the threshold THent, one of fade detect flags is set to represent the indication. At this time, the fade detector 56 specifies the direction of the time dependent change of the image feature using the sign signal applied thereto from sign/absolute value separator 48. More specifically, if the sign signal (viz., sign bit) is negative (minus), the fade determiner 56 sets a fade-out flag, and, on the other hand, if the sign signal is positive (plus), the fade determiner 56 sets a fade-in flag.

Further, in the case where the fade detector 56 determines a fade transition the detector 56 informs the fade duration predictor 58 of the fade-in or fade-out occurrence via line 60 or 62. The fade duration predictor 58, in response to the information from the detector 56, acquires the distinctive feature of the current image from the image feature determiner 40 via a line 64, the distinctive feature of the preceding image at the time when the counter 52 initially increments the content thereof via a line 66, and the content of the counter 52 via a line 68. Thereafter, the predictor 58 generates predicted fade duration using final values (described in a later time) corresponding to the fade-in or fade-out.

Figure 4:
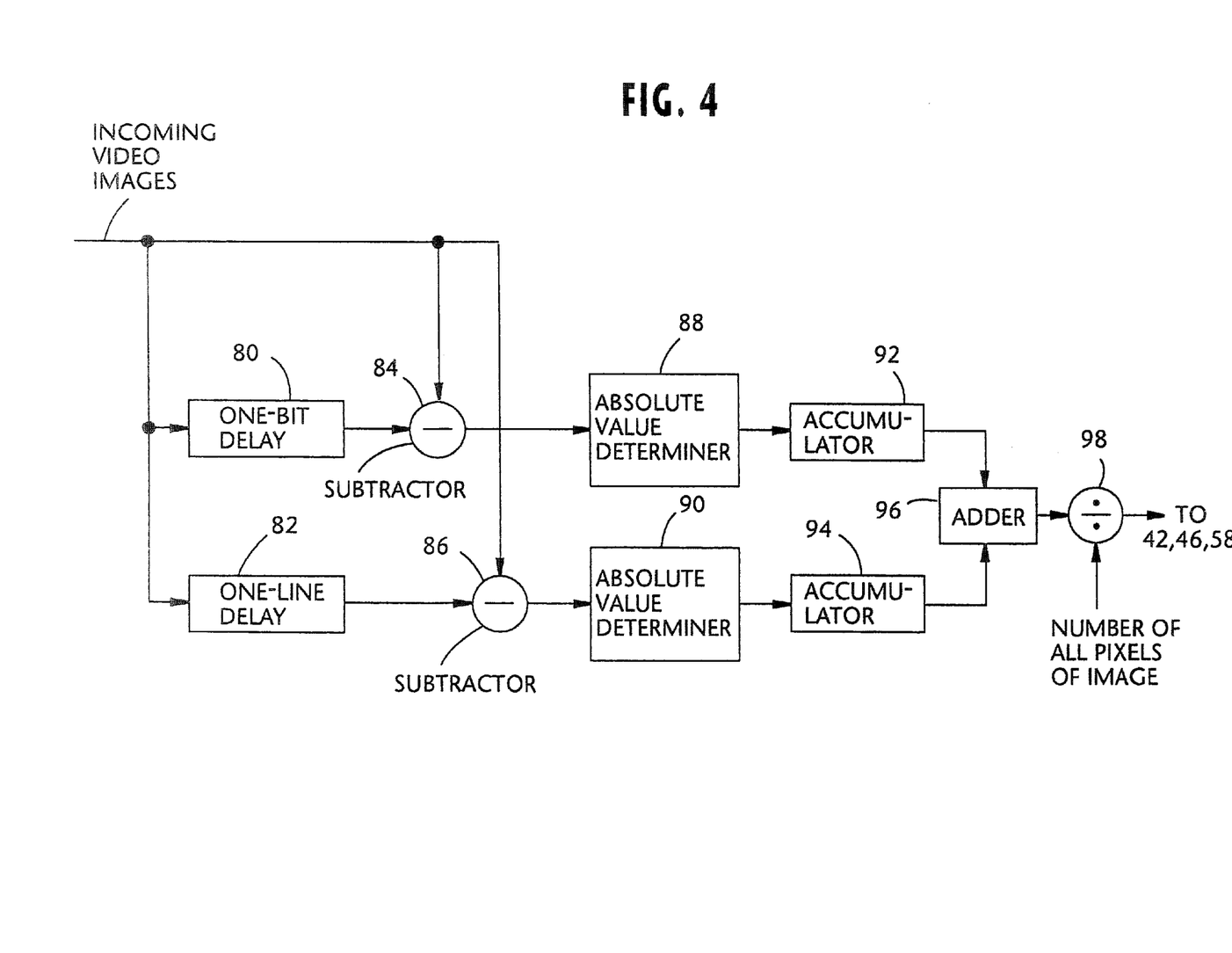
FIG. 4 is a block diagram showing a block of FIG. 3 in detail.

FIG. 4 is a block diagram showing in detail the arrangement or the image feature determiner 40 of FIG. 3.

As shown in FIG. 4, the image feature determiner 40 comprises a one-bit delay circuit 80 for delaying an incoming image by one bit, a one-line delay circuit 82 for delaying art incoming image by one line, subtractors (difference detectors) 84 and 86, absolute value calculators 88 and 90, accumulators 92 and 94, an adder 96, and a divider 98.

In the case where a two-dimensional image is inputted to the image feature determiner 40 on a line-by-line basis, the one-bit delay circuit 80 delays the incoming pixel data by one pixel duration. The subtractor 84 calculates the difference between the incoming pixel value and the value of the corresponding pixel which has been delayed by one pixel duration. The difference value thus calculated is applied to the absolute value calculator 88 at which the absolute value thereof is obtained. Thereafter, the absolute values of the pixel difference values are successively accumulated at the accumulator 92, it the above-mentioned processes are implemented from the first pixel of each line of the image, the absolute values of pixel differences with respect to all of the horizontal lines of the image are obtained.

In a similar manner, the one-line delay circuit 82 delays the incoming pixel line data by one line duration. The subtractor 88 calculates the difference between the incoming pixel value and the value of the corresponding pixel delayed by one scanning line. The difference value between the two pixels on the two adjacent lines is applied to the absolute value calculator 90 at which the absolute value thereof is obtained. Thereafter, the absolute values of the pixel difference values between the two adjacent lines are successively accumulated at the accumulator 94. If the above-mentioned processes are implemented from the first line of the image, the absolute values of pixel differences with respect to all the vertical direction of the image are obtained.

The outputs of the accumulators 94 and 95 are summed at this adder 96, the output of the adder 98 is divided, at a divider 98, by the number of pixels of one image data. Titus, an average value of the image feature is obtained from the divider 98 and is outputted from the image feature determiner 40.

Figure 5:
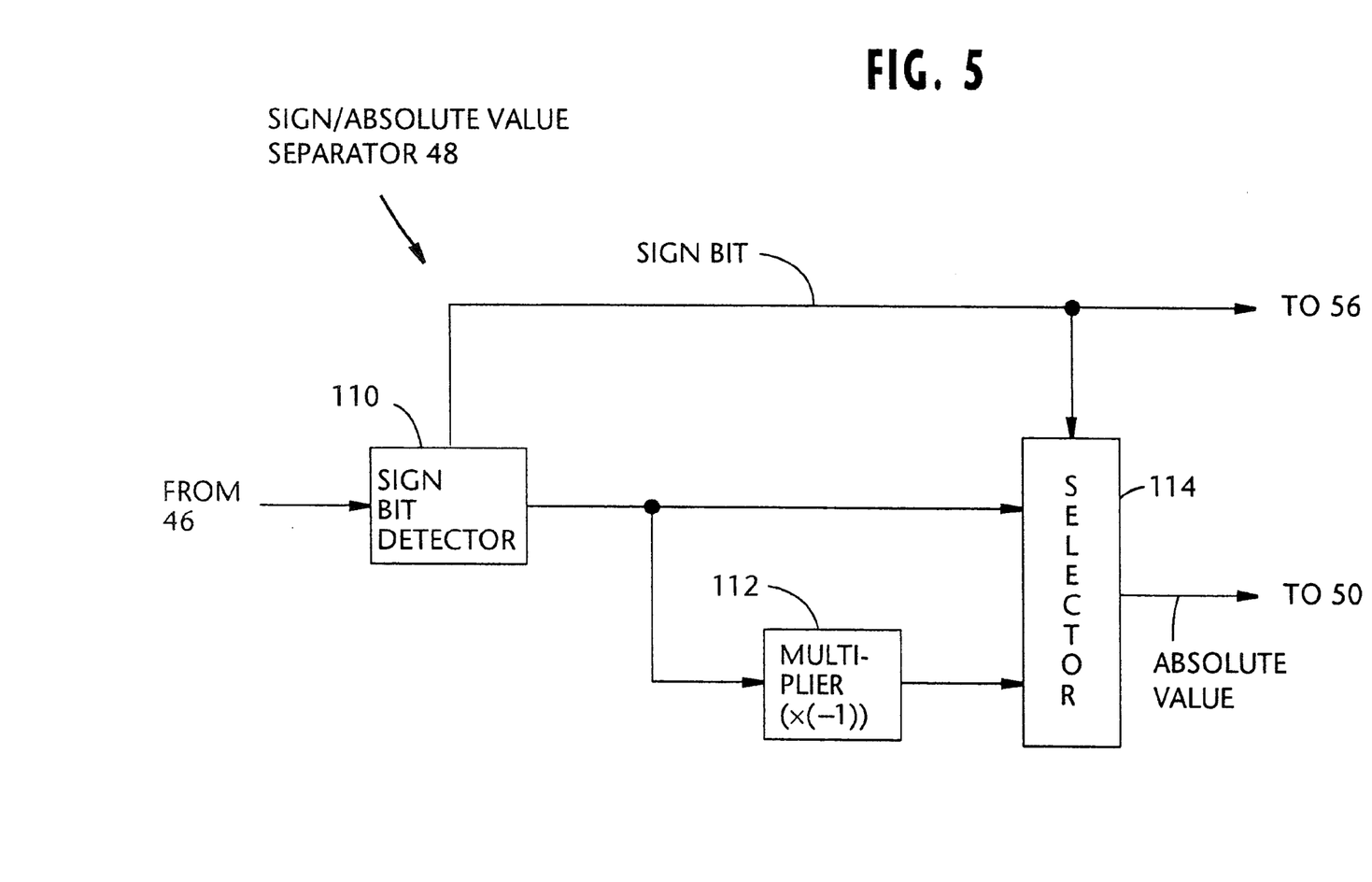
FIG. 5 is a block diagram showing another block of FIG. 3 in detail.

FIG. 5 is a block diagram showing in detail the arrangement of the sign/absolute value separator 40 of FIG. 3.

As shown in FIG. 5, the sign/absolute value separator 48 comprises a sign bit detector 110, a multiplier 112 for multiplying an incoming signal by (−1), and a selector 114. The output of the subtractor 48 (FIG. 3) is applied to the sign bit detector 110 at which the sign bit is detected and applied to both the selector 114 and the fade detector 56 (FIG. 3). The output of the sign bit detector 110, which includes the sign bit, is applied to the multiplier 112 and is multiplied by (−1). Thus, the output of the signal bit detector 110 is reversed, and then is applied to the selector 114. The selector 114 allows the data, directly applied from the sign bit detector 110 (viz., the raw data applied to the sign/absolute value separator 48)to pass therethrough if the sign signal applied thereto is positive. On the contrary the selector 114 allows the data, applied from the multiplier 112, to pass therethrough if the sign signal applied thereto form the sign bit separator 110 is negative. Thus, the sign and the absolute value are separated and then are respectively applied to the fade detector 56 and the comparator 50 (both in FIG. 3).

Figure 6:
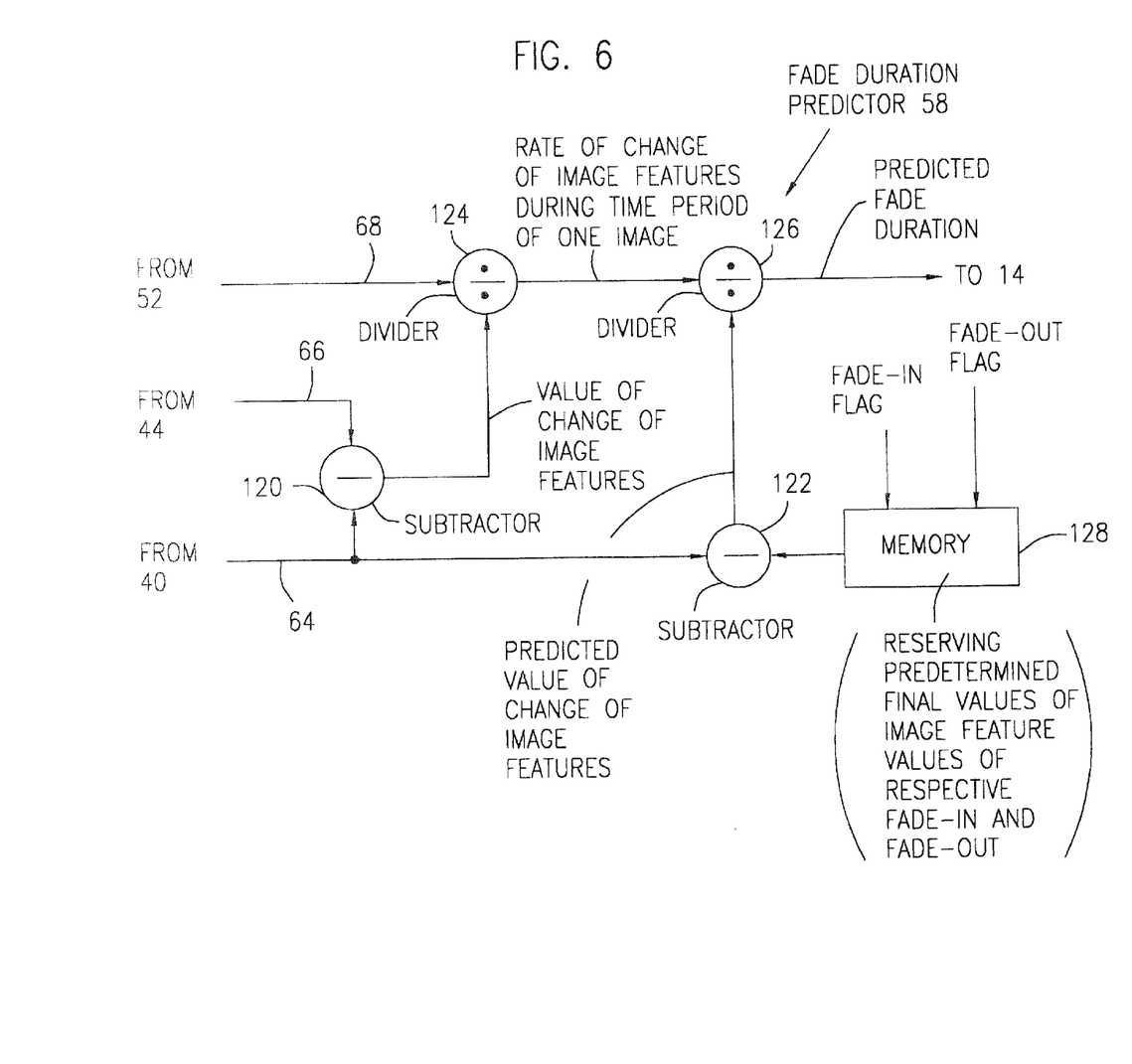
FIG. 6 is a block diagram showing another block of FIG. 3 in detail.

FIG. 6 is a block diagram showing in detail the arrangement of the fade duration predictor 58 of FIG. 3.

As shown in FIG. 6, the fade duration predictor 58 comprises two subtractors (difference detectors) 120 and 122, two dividers 124 and 126, and a memory 128. The subtractor 120 receives the image feature date outputted from the image feature determiner 40 (FIG. 3) via the line 64 and the image feature data outputted from the register 11 via the line 66. Subsequently, the subtractor 120 generates a difference between the two image feature data and supplies the divider 124 with the difference which indicates the amount of the change of the image features. The divider 124 is also supplied with the output of the counter 52 via the tine 68, which output indicated the number of images after the comparator 50 initially detects that the absolute value from the separator 48 exceeds the threshold THdiff. The divider 124 divides the amount of the time dependent change of the image features (from the subtractor 120) by the above-mentioned number of images. Thus, the divider 124 generates the change rate of the image feature over a time period of one image. This change rate is applied to the divider 126.

The memory 128 stores two previously determined final values of the image features, which final values respectively correspond to fade-in and fade-out. The final value corresponding to the fade-in is outputted in response to the fade-in flag applied thereto from the fade determiner 56 (FIG. 3) via the line 60. On the other hand, the final value corresponding to the fade-out is outputted in response to the fade-out flag applied thereto from the fade determiner 565 (FIG. 3) via the line 62. The subtractor 122 determines a difference between the current image feature and the one of the final value (viz., the present fade-in final value or present fade-out final value) and supplies the divider 126 with the determined difference value as a predicted amount of image feature. Thereafter, the divider 126 divides the predicted amount of image feature from the subtractor 122 by the change rate of the image feature from the divider 124 whereby the predicted fade duration is outputted from the divider 126.

Figure 7:
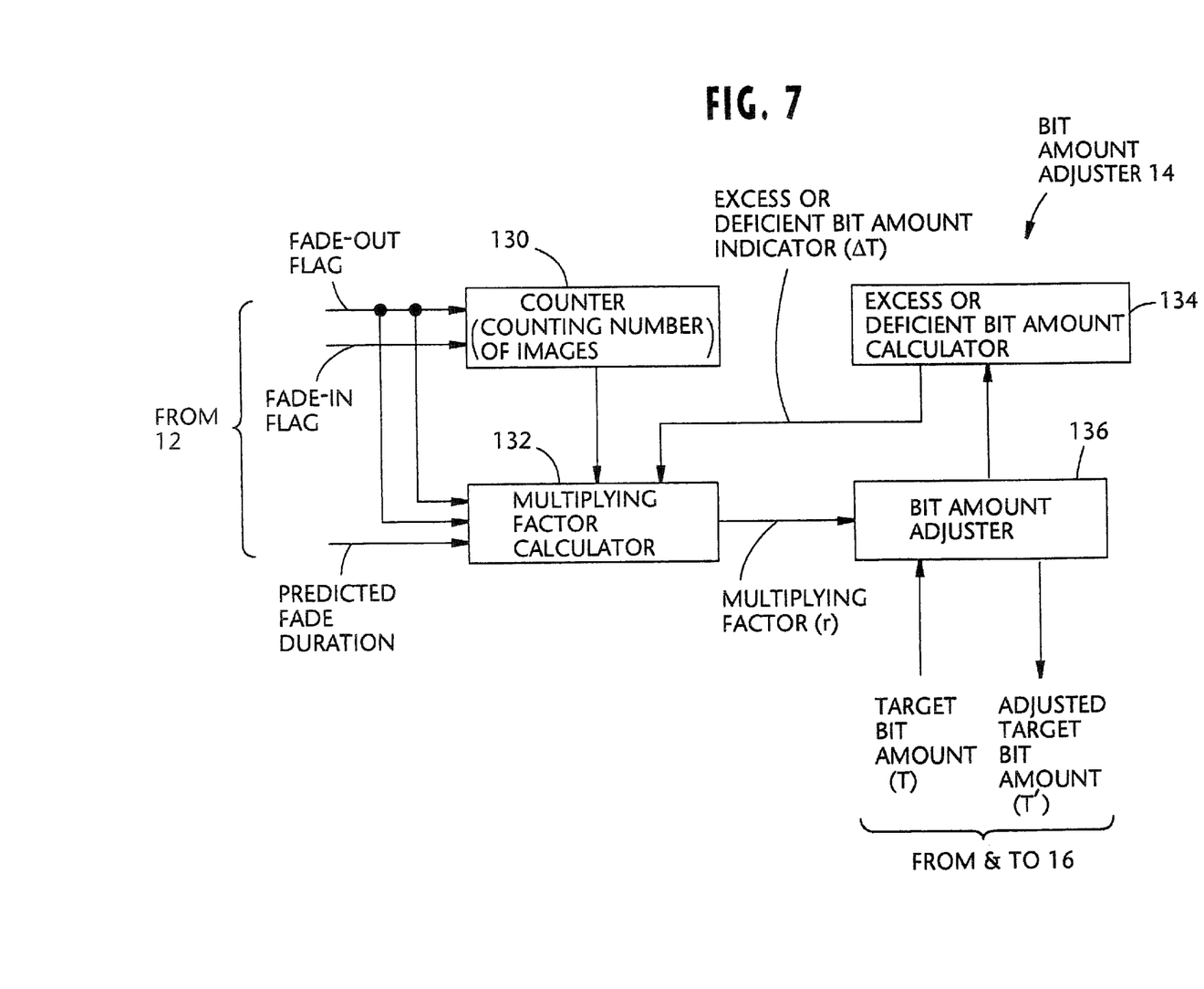
FIG. 7 is a block diagram showing a block of FIG. 1 in detail.

FIG. 7 is a diagram showing one example of the bit amount adjuster 14 (FIG. 1). As shown, the bit amount adjuster 14 comprises a counter 130 for counting the number of pictures (images), a multiplying factor calculator 132, an excess or deficient bit amount calculator 134, and a bit amount adjuster 136.

In the following description, it is assumed that the image encoder 16 utilizes encoding techniques disclosed in the Test Model 5 of MPEG-2 which has been referred to in the above. According to the Test Model 5, the number of bits, which is determined based on a predetermined bit rate, is assigned to each of picture groups each consisting of a plurality of images at each of the picture groups, an available number of bits, which is determined by subtracting the actually used number of bits from the assigners total number of bits, is distributed (assigned) to the pictures which have not yet been encoded. More specifically, the available bits are respectively distributed to the pictures, which have not yet been encoded, depending on the degree of difficulty for encoding the respective pictures. The number of available bits, which have been assigned to each picture, is referred to a target number of bits.

In FIG. 7, the picture number counter 130 is supplied with the fade-in and fade-out flags and counts the number of pictures after the fade has been detected. Although not shown in FIG. 7, in order to count the number of pictures, the incoming video images may be applied to the counter 130 by way of example. The counted number of pictures is fed to the multiplying factor calculator 132. This calculator 132 is supplied with the fade-in flag, the fade-out flag, and the predicted fade duration, all outputted from the, fade detector 12 (FIG. 1). During fade transitions are detected the multiplying factor calculator 132 calculates a multiplying factor "r" for adjusting the assigned number of bits using the number of pictures from the counter 130 and the predicted fade duration. On the other hand, during no fade transition us detected the multiplying factor calculator 132 adjusts the multiplying factor "r" depending on the magnitude of the excess or deficient bit amount indicator Δt outputted from the calculator 134. The bit amount adjuster 136 receives the target bit amount from the motion picture encoder 16 (FIG. 1), and multiplies the target bit amount T by the factor Y. The target bit amount T is previously determined for each picture in the motion picture encoder 16 (FIG. 1). Thereafter, the bit amount adjuster 136 adjusts the target bit amount T and returns the adjusted target bit amount T to the motion picture encoder 16.

The motion picture encoder 16 of FIG. 1, in response to the application thereto of the adjusted target bit amount T', adjusts the available bit amount R. The adjusted available bit amount (depicted by R') is represented by $$R'=R+(T'-T).$$

The adjusted values T' and R' respectively become a new target bit amount and a new available bit amount, and are used for encoding the currently incoming picture.

The excess or deficient bit amount calculator 134 accumulates the differences between two target bit amounts each before and after the bit amount adjusting operation, observing the excess or deficient bit amount, and generating the excess or deficient bit amount indicator Δt. The motion picture encoder 16 carries out the control of feeding back the difference between the actually used bit amount and the target bit amount. The average of the adjusted target bit amount that is set by the bit amount adjuster 14, is controlled such as to correspond to the average bit rate (or predetermined bit rate). Accordingly, the encoding process is eventually performed at the predetermined bit rate in average.

Figure 8:
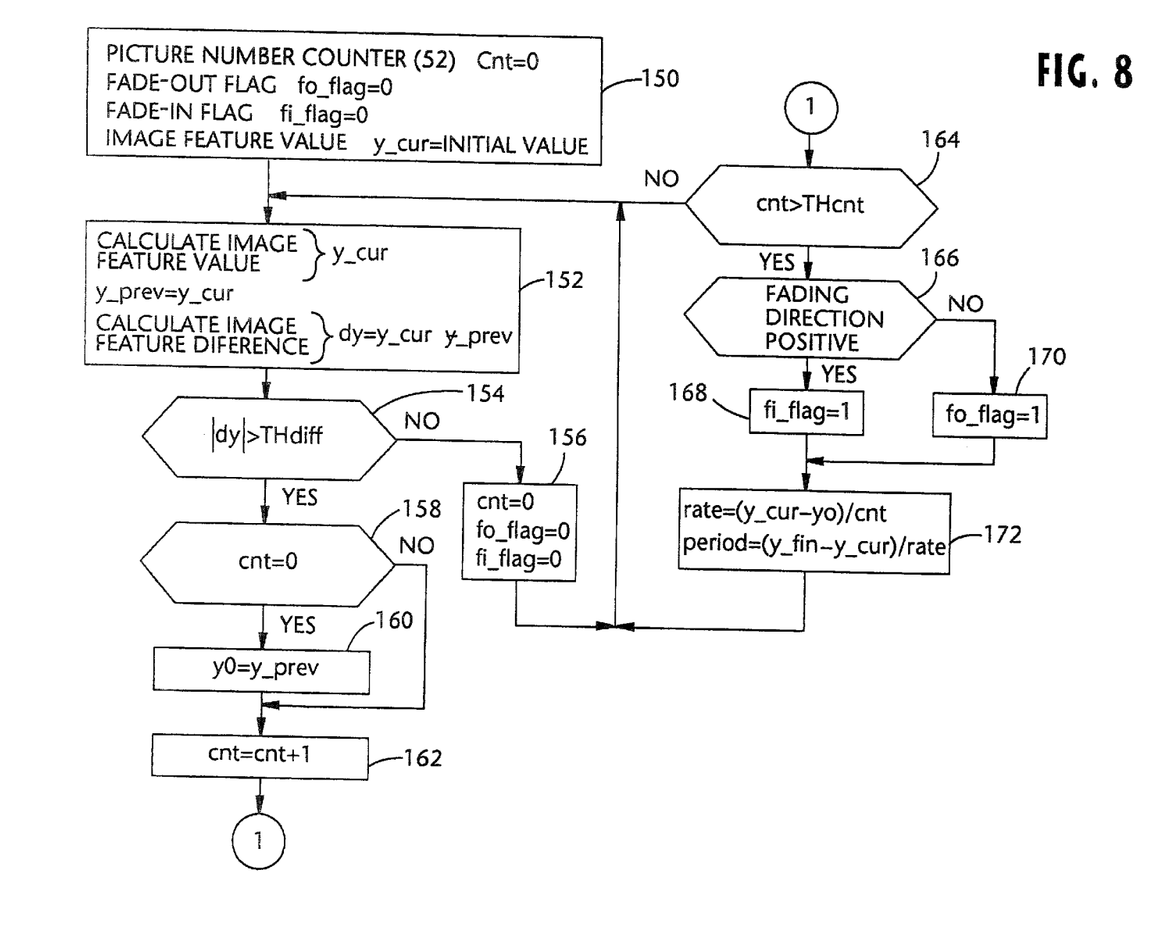
FIG. 8 is a flow chart which shows the steps which characterize the operation of the fade detector according to the embodiment of the present invention.

FIG. 8 is a flow chart which shows the steps which characterize the operation of the fade detector 12 (FIG. 1) and the detailed arrangements (FIGS. 3, 4, 5 and 6).

At step 150, prior to the encoding operation at the encoder 10 (FIG. 1), the picture number counter 52 (depicted by cnt) is initialized. Further, both of the fade-out flag (fo__flag) and the fade-in flags (fi__flag) are initialized. Still further, the image feature value (y__cur) is also initialized. Thereafter, after the encoding operation starts, at step 152, the current image feature (y__cur) is calculated, and this image feature (y_cur) is stored as a previous image feature in the register 42 (y_prev=y_cur). Further, the image feature difference is calculated (dy=y_cur-y_prev). The operations at step 152 are implemented with each picture.

Subsequently, the routine goes to step 154 whereat a check is made to determine if |dy|>Thdiff. If the inquiry made at step 154 is negative, the program proceeds to step 156 at which the counter 52 and the fade-out and fade-in flags are all initialized (cnt=0, of_flag=0, and fi_flag=0), and the routine returns to step 152. On the other hand, if the inquiry made at step 154 is positive, a further check is made at step 158 if the content of the counter 52 is zero (cnt=0). If the inquiry at step 158 is positive, the routine goes to step 160 at which the preceding image feature (y_prev) is retained (y0=y_prev). Thereafter, at step 162, the content of the counter 52 is incremented by one (cnt=cnt+1). On the other hand, if the inquiry at step 158 is negative, the routine goes directly to step 162.

Subsequently, the routine goes to step 164 at which a check is made to determine it cnt>THcnt. If the inquiry at step 164 is negative, the routine goes to step 152 and the above mentioned snaps are implemented. Contrarily, if the inquiry at step 104 is positive, the routine goes to step 166 at which a further check is made to determine if the fading direction is positive. If the inquiry direction 13 positive, the fade is found to be a fade-in transition, and the routine goes to step 168 at which the fade-in flag is set (fi flag=1), and otherwise, the routine goes to step 170 at which the fade-out flag is set (of flag=1). Thereafter, the routine proceeds to step 172 at which the rate of change of image features (depicted by "rate") which is referred to in FIG. 6, is calculated (rate=(y_cur-y0)/cnt). Further at step 172, the predicted fade duration (depicted by "period") is calculated (period=(y_fin-y_cur)/rate).

Figure 9:
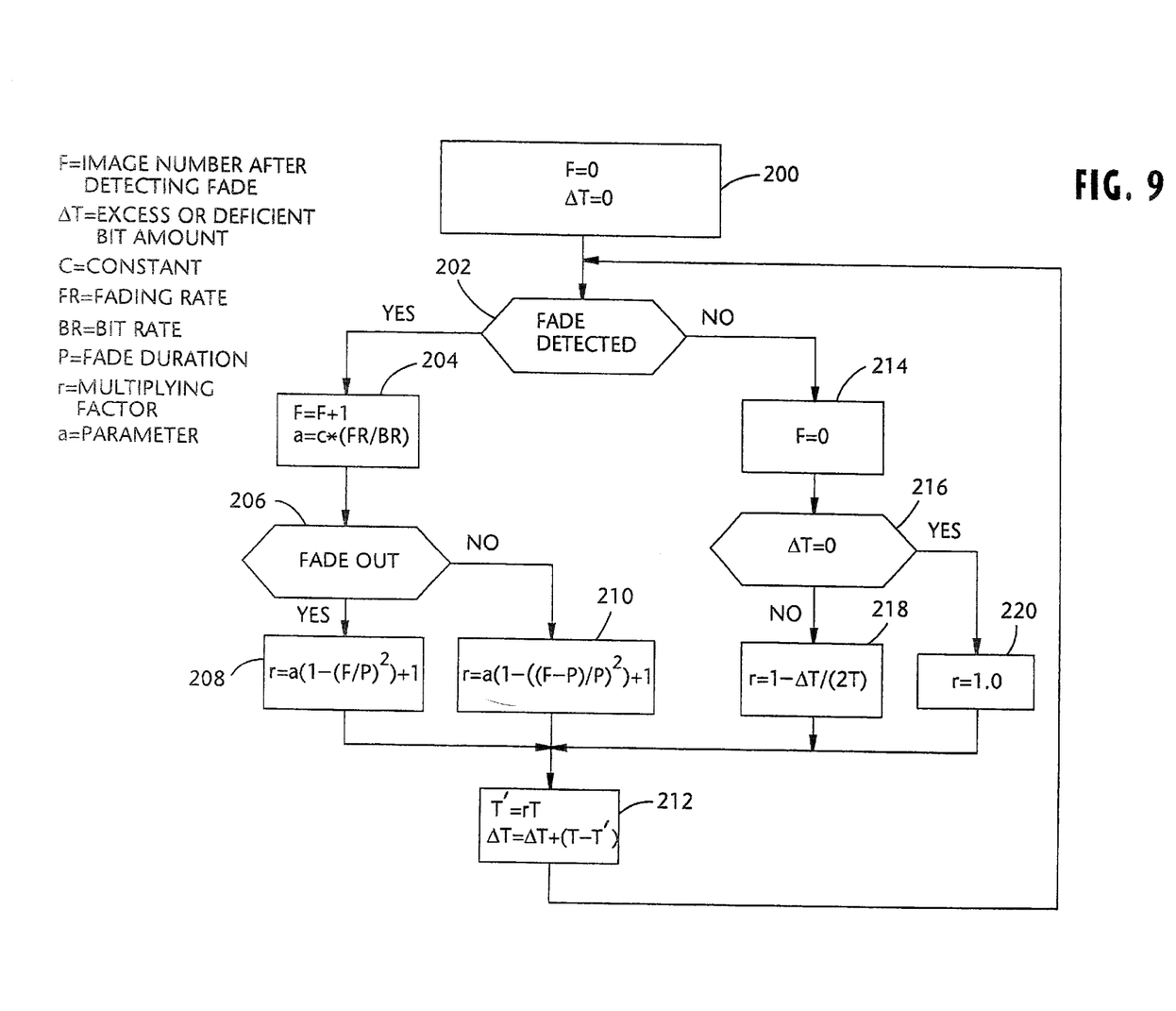
FIG. 9 is a flow chart which shows the steps which characterize the operation of a bit amount adjuster according the embodiment of the present invention.

FIG. 9 is a flow chart which shows me steps which characterize the operation of the bit amount adjuster 14 (FIG. 1) and the detailed arrangement (FIG. 7).

In FIG. 9, at step 200, F(=the number of picture after fade) is initialized, and also the excess or deficient bit amount $\Delta t$ is initialized. At step 202, a check is made to determine if fade is detected. If fade is detected (viz. YES) at step 202, the routine goes to step 204 at which the picture number F is incremented (F=F+1) by one. Further at step 204, a parameter "a" is calculated using equation of(a=C*FR/BR)) where the parameter "a" indicates a peak value of the multiplying factor "r", and C is a constant value, FR is a fading rate and BR is a bit rate. Thereafter, the routine goes to step 206 at which a check is made to determine if fade-out occurs. If the inquiry made at step 206 is positive (fade-out), the routine proceeds to step 208 at which the multiplying factor "r" is calculated using equation of(r=a(1-F/P)$^2$)+1). Thereafter, at step 212, the predicted target bit amount T' and the excess or deficient bit amount $\Delta t$ are calculated T=rt, $\Delta T=\Delta T(T=T')$. Thereafter, the routing returns to step S202. On other hand, if the inquiry at step 206 is negative (viz., fade-in), then the routine goes to step 210 at which the multiplying factor "r" is calculated using equation of(r=a (1-((F-P)/P)$^2$)+1), after which the routine goes to step 212 and then returns to step 202.

In the above, if the inquiry made at step 202 is negative (viz. no fading), the routine goes to step 214 at which the image number F is initialized. Thereafter, at step 216, a check is made to determine if $\Delta T$=0. If the inquiry at step 216 is negative, the routine goes to step 218 at which the multiplying factor "r" is calculated using the equation of ((r=1-$\Delta T$/2T)). On the other hand, if the inquiry at step 216 is positive (viz., YES), the routine goes to step 220 at which the multiplying factor "r" is step to 1.0 after which the program proceeds to step 212 and then returns to step 202.

In the above, according to equation for calculating the multiplying factor "r", the amount of bits which is increased is equal to the amount of bits which is decreased during the fade transitions. Accordingly, it is understood that the excess and deficient bit amount, which is caused by the bit amount adjusting during the fade, can be rendered to zero.

Further, in the above. In order to prevent excessive bit amount adjust, the values of the parameters "a" and "r" may be restricted using predetermined upper and lower limits.

In order to prevent undesirable changes due to noise or flash in the fade detector 14, it is preferable to provide an average filter, a median filter, etc, and pass the obtained image feature signal therethrough.

Still further, the fade-in and fade-out is detected using the identical threshold. However, it is within the scope of the present invention to use two different thresholds.

Still further, in the above, the number of pictures is counted immediately after the image feature exceeds the threshold THdiff. This means that the counting of the number of pictures is initiated before fade detection is ascertained. However, it is within the scope of the present invention to provide two thresholds for controlling the operation of the counter 52. That is, one threshold is dedicated to increment of the counter, arid the other is use to reset the counter. In such a case, it is possible to properly detect fade transitions even if the image feature outputted from the determiner 40, changes gradually but exhibits different changing values.

It is known that the image degradation during fade is conspicuous in the case of rapid fading. Therefore, it is preferable to quickly detect fade in such a case. To this end, obtained is a difference between the image feature value when it exceeds the threshold value THdiff and the current image feature value. Thereafter, the aforesaid difference is multiplied by the above-mentioned number of pictures, which has been counted after the image feature initialed exceeds THdiff. Further, the absolute value of the product thus obtained is used as a new indicator which is then compared with a threshold for detecting fade transition.

In FIG. 9, the multiplying factor "r" is calculated using the quadratic equations shown at steps 208 and 210. However, it is within the scope of the present invention to use another equations if they are able to increase the allocated bit amount during the time period of fading, during which the image degradation becomes conspicuous.

In the foregoing, the motion picture encoder 16 employs TEST MODEL 5 of ISO/IEC JTC1/SC29/WG11/N0400. However, it is possible to use the techniques disclosed in ISO/IEC 10072-2 (MPEG-1). ITU-T H.261, or 111.1-T H 263, etc.

Figure 10:
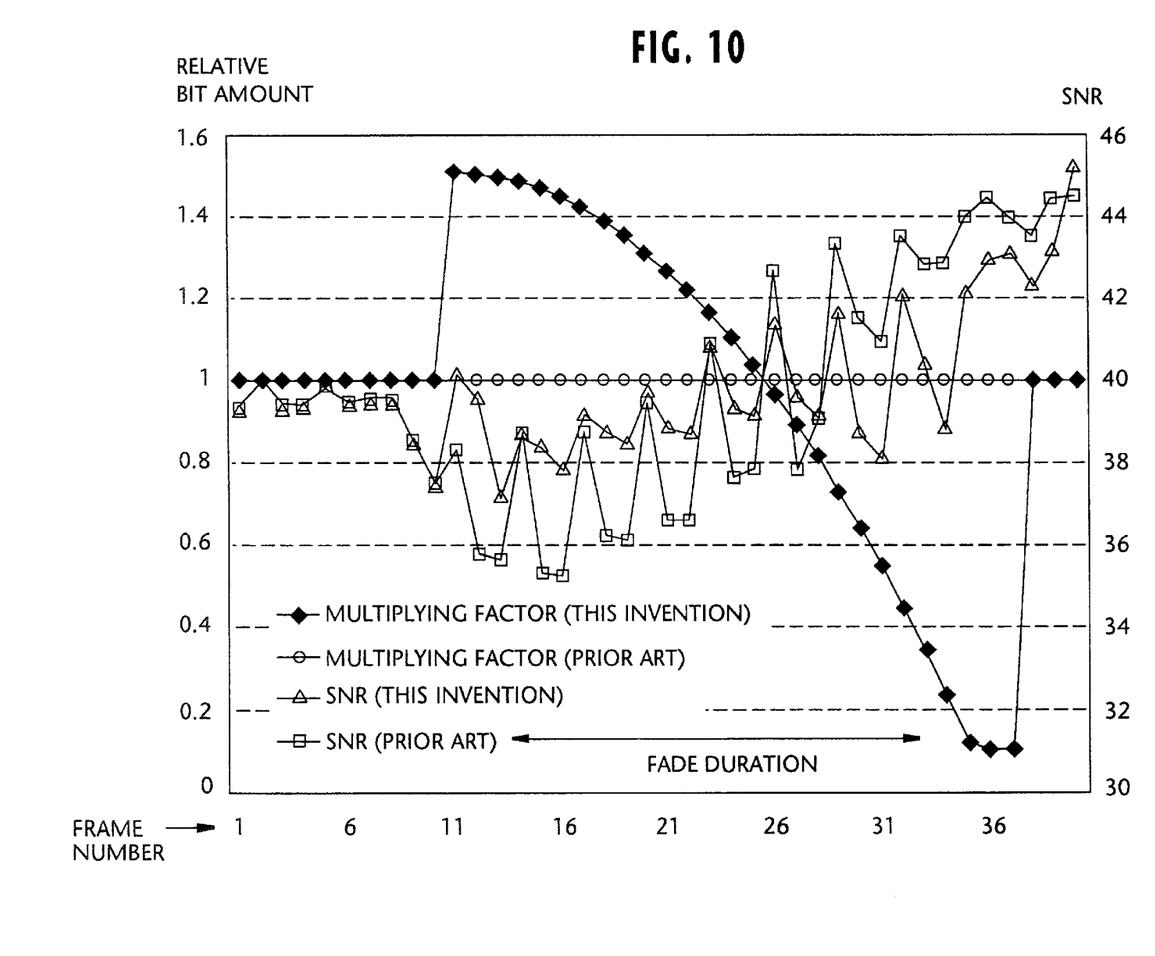
FIG. 10 is a sketch that shows the results of computer simulation in connection with the embodiment of the present invention, which computer simulation was conducted by the invention.

FIG. 10 is a sketch showing the results of computer simulation conducted by the inventor. In this computer simulation, fade-out images are encoded using MPEG-2 at 3Mbps. The multiplying factor, which is used for determining the assigned bit amount, is calculated using the quadratic equations shown in FIG. 9. It is understood that the image degradation due to lowering of SNR (signal to noise ratio) during around the first half is improved compared with the known technique. This result is advantageous in that the first half of the fade duration is the portion where the image degradation is conspicuous. Although the SNR according to the present invention is lowered relative to the known technique, the lowered values of SNR does not leads to conspicuous image degradation because the SNR lowering occurs during the second half of fade. Further, the lowered SNR during the second half is cancelled by the advantage of the present invention that the undesirable bit amount can be suppressed during the second half. Therefore, it is possible to prevent image degradation during fade transitions without undue variation of bit rate.

It will be understood that the above disclosure is representative of preferred embodiments of the present invention and that the concept on which the present invention is based is not specifically limited thereto.

What is claimed is:

1. An apparatus for encoding video images including a fade transition using inter frame prediction, comprising:

fade detector for detecting a fade transition by analyzing incoming images successively applied thereto, said fade detector generating first information indicating if said fade transition is fade-in or fade-out, said fade detector predicting fade duration and generating second information indicating predicted fade duration;

a bit amount adjuster for adjusting allocated bit amount during fade using said first and second information; and a motion image encoder for encoding said incoming images using an amount of bits determined by said bit amount adjuster.

2. An apparatus as claimed in claim 1, wherein said fade detector implements fade detection using a plurality of image features detected among said incoming images.

3. An apparatus as claimed in claim 2, wherein the image feature is determined using local spatial information within an image.

4. An apparatus as claimed in claim 2, wherein the image feature is determined using adjacent pixels within an image.

5. An apparatus as claimed in claim 2, wherein the image feature is determined using differences between adjacent pixel values within an image.

6. An apparatus as claimed in claim 1, wherein said fade detector predicts said fade duration using time dependent changes of image features.

7. An apparatus as claimed in claim 1, wherein said first information indicating fade-in or fade-out uses a plurality of flags.

8. An apparatus as claimed in claim 1, wherein said fade detector counts a plurality of successive images each of which has a time dependent image feature in excess of a first predetermined threshold, said fade detector detects the fade transition.

9. An apparatus as claimed in claim 8, wherein the fade transition is determined as fade-in if the time dependent image feature increases and is determined as fade-out if the time dependent image feature decreases.

10. An apparatus for encoding video images including a fade transition, the apparatus comprising:

a fade detector which is effective to detect a fade transition in the video images, the fade detector effective to generate first data indicating that the fade transition is one of fade-in and fade-out, the fade detector further effective to predict a fade duration of the fade transition and to generate second data relating to the fade duration;

a bit amount adjuster coupled to the fade detector, the bit amount adjuster effective to determine a bit amount for encoding of the video images based on the first and second data; and a motion image encoder which is effective to encode the video images using an amount of bits determined by the bit amount adjuster.

11. A method of encoding video images including a fade transition, comprising the steps of:

detecting a fade transition in the video images;

generating first data indicating that the fade transition is one of fade-in and fade-out;

predicting a fade duration of the fade transition;

generating second data relating to the fade duration;

determining a bit amount for encoding of the video images based on the first and second data; and encoding the video images using an amount of bits based on the determining.

12. The method as recited in claim 11, wherein the fade transition detection is implemented using a plurality of image features detected among the video images.

13. The method as recited in claim 12, wherein the image features are determined using local spatial information within the images.

14. The method as recited in claim 12, wherein the image features are determined using adjacent pixels within the images.

15. The method as recited in claim 12, wherein the image features are determined using differences between adjacent pixel values within the images.

16. The method as recited in claim 11, wherein the prediction of the fade duration is implemented using time dependent changes of image features.

17. The method as recited in claim 11, wherein the first information indicating fade-in or fade-out uses a plurality of flags.

18. The method as recited in claim 11, wherein the fade transition is detected by counting a plurality of successive images each of which has a time dependent image feature in excess of a threshold.

19. The method as recited in claim 18, wherein the fade transition is determined as fade-in if the time dependent image feature increases and is determined as fade-out if the time dependent image feature decreases.

* * * * *